Patented Sept. 25, 1951

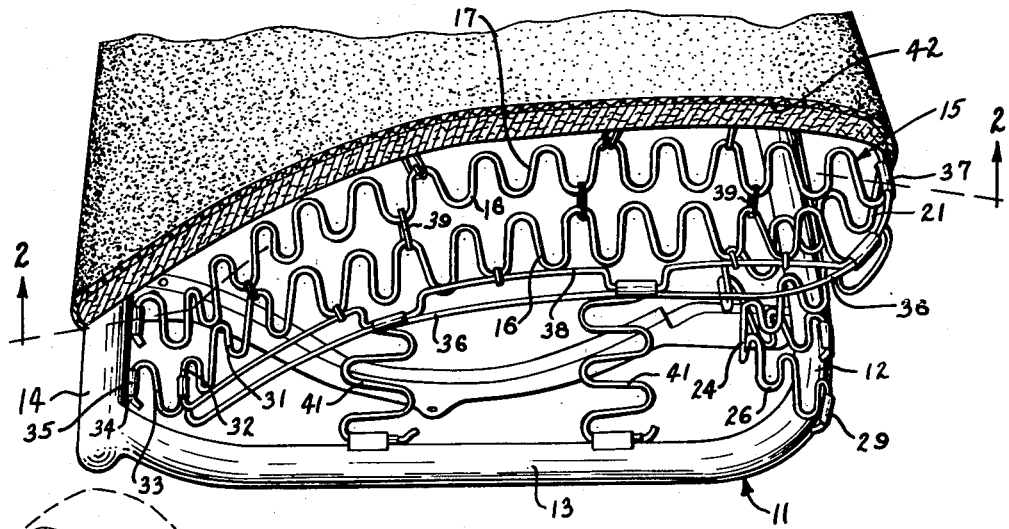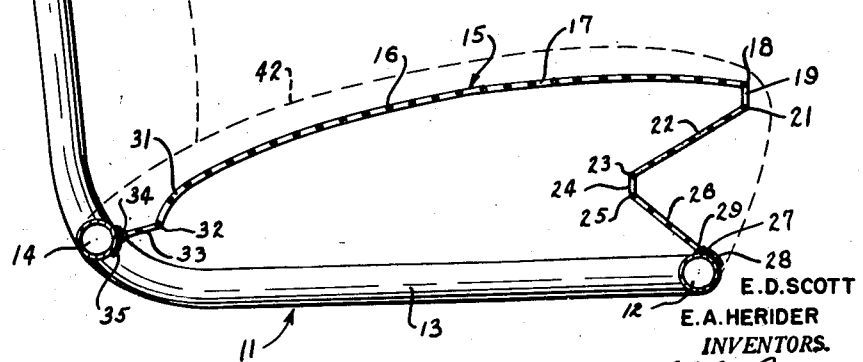

2,568,829

UNITED STATES PATENT OFFICE 2,568,829

SPRING SEAT CONSTRUCTION

Edwin D. Scott, Plymouth, and Elmer A. Herider, Dearborn, Mich., assignors to Ford Motor Company, Dearborn, Mich., a corporation of Delaware Application December 29, 1945, Serial No. 637,918

3 Claims. (Cl. 155—179)

1

This invention relates generally to a spring seat construction, and more particularly to a cushioned seat construction embodying flat wire springs of sinuous or corrugated shape.

Cushioned seats for automobiles or the like have heretofore been constructed of sinuous or corrugated flat springs extending crosswise of the seat frame between the front and rear rails thereof, in which each of the springs included a crowned seating portion with the forward end thereof resiliently connected to the front rail of the seat frame by means of an inwardly extending V-shaped portion formed integrally with the seating portion. Although this construction forms a resilient support for the front of the seating portion, it has a serious disadvantage, namely, that a large torsional load is placed upon the single loop of the corrugated spring at the juncture between the seating portion and the upper end of the V-shaped portion, with a similar heavy torsional load being placed upon the single loop at the vertex of the V-shaped portion. Repeated use of the seat and flexure of the forward portion thereof is likely to result in fatigue at these two points and finally in a failure or breaking of the spring.

It is accordingly an object of the present invention to overcome the deficiencies mentioned above in a spring of the type referred to by providing a construction which affords the desired flexibility and resiliency at the forward portion of the seat, yet which is resistant to failure due to torsional and bending stresses. This is accomplished in the present instance by providing a double bend at the point where the V-shaped portion joins the crowned seating portion, and at the vertex of the V-shaped portion. The integral double bend at each of these points distributes the torsional stress between a pair of adjacent loops of the sinuous wire spring. Consequently, the maximum torsional stress carried by a single loop is greatly reduced, and this is accompanied by a considerable reduction in the likelihood of breakage.

Difficulty has also been encountered in cushioned seats of the type referred to above in obtaining the desired degree of flexibility in a vertical direction adjacent the rearward portion of the seat, since this part of the seat is required to support the greatest load.

Another object of the invention, therefore, is to provide an improved corrugated wire spring for a cushioned seat which eliminates undesirable stiffness in the rearward portion of the seating surface so as to provide proper seating comfort upon seats of this character. A continuously corrugated flat spring is utilized in which the rearward part of the crowned seating portion of the spring continues into a sharply downwardly curved portion, the lower part of which is substantially vertical, with an integral lever arm extending rearwardly therefrom and connected at its rear end to the rear rail of the seat frame.

The invention provides a seat having superior cushioning qualities both at the forward edge of the seating portion and in the rearward portion thereof which carries the major part of the load. In addition, since the spring is formed of a continuous section of corrugated flat spring, it is economical to manufacture and install.

Other objects and advantages of the present invention will be made more apparent as this description proceeds, particularly when considered in connection with the accompanying drawings, in which:

Figure 1 is a perspective view, partly broken away, of a wire spring seat construction embodying the present invention.

Figure 2 is a vertical cross sectional view taken substantially on the line 2—2 of Figure 1.

Figure 3:
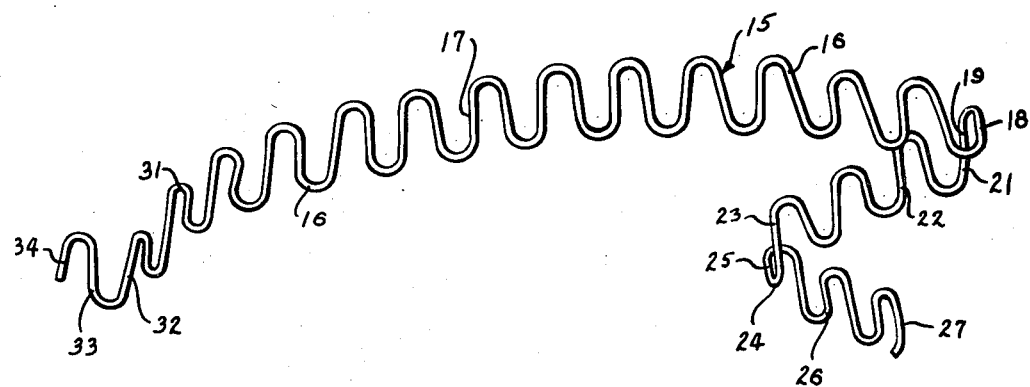
Figure 3 is a perspective view of one of the corrugated wire springs detached from the seat frame.

Referring now to the drawing, and particularly to Figure 1, the reference character 11 indicates a seat frame which may be of any type or construction and formed of any material, but which is shown here as formed of hollow tubing and having a front rail 12, side rails 13, and a rear rail 14. A plurality of transversely spaced springs 15 extend crosswise of the frame 11 between the front and rear rails 12 and 14. Each spring unit 15 is made of steel wire, bent to a sinuous or corrugated shape, so that adjacent loops 16 thereof are substantially parallel to each other and enable the spring to be longitudinally stretched or compressed under load. Each spring unit is continuously corrugated from one end to the other, simplifying the construction and reducing the cost thereof, since the sinuous wire spring can be made by a continuous process, cut to length, and then bent to the particular form required.

The seating portion 17 of the spring is slightly crowned and extends generally horizontally. At the front loop 18 of the seating portion of the spring, the spring is bent downwardly in a generally vertical direction to form the short connecting portion 19. At loop 21 of the spring, which is immediately below loop 18, the spring is bent rearwardly to form a lever arm 22 extending rearwardly and downwardly from the loop 21. It will be noted that any relative movement or flexure between the seating portion 17 and the lever arm 22 results in placing the adjacent loops 18 and 21 of the corrugated spring in torsion, with the torsional stress being divided between the loops.

At the rearward end of the lever arm 22, as defined by the spring loop 23, the spring is again bent downwardly to form a short generally vertically extending connecting portion 24. At the next loop beneath loop 23, indicated by the reference character 25, the corrugated spring is bent forwardly to form an attaching portion 26 which extends forwardly and downwardly from the loop 25. The lower end loop 27 of the attaching portion 26 of the spring is connected to the front rail 12 of the seat frame by means of a suitable clip 28. The body portion of clip 28 is riveted or otherwise suitably secured to the front rail, and has an upper flange 29 adapted to be crimped over the lower end loop 27 of the spring to secure the latter to the frame.

The crowned seating portion 17 of the spring is inclined slightly downwardly in a rearward direction, to provide the maximum seating comfort, and continues into the sharply downwardly curved portion 31, the lower part of which is substantially vertical. At the lower loop 32 of the downwardly curved portion 31, the corrugated spring is bent rearwardly to form the inclined lever arm 33 which extends generally rearwardly and slightly downwardly. If desired, the lever arm 33 can extend horizontally, or be inclined slightly upwardly. The lever arm 33 terminates in a loop 34 which is connected to the rear rail 14 of the seat frame 11 by means of a clip 35 secured to the rail and crimped over loop 34.

As best seen in Figure 1, all of the springs 15 are interconnected by a border wire 36, the latter being secured by clips 37 to the loops 18 at the front edge of the seating portion 17 of the seat. The border wire 36 extends along each side of the seat, and is connected at each end to one of the loops of a spring 15 at the sides of the seat. The lateral edges of the seat are additionally supported by arch wires 38 positioned adjacent the border wire 36. Wire hooks 39 interconnect adjacent springs 15 to help distribute the load, and corrugated arch supports 41 extend from each side rail 13 of the frame to the adjacent border wire 36 and arch wire 38 to resiliently support the sides of the seat. The arch supports are generally V-shaped, having a double bend at their vertexes to distribute the torsional load between a pair of adjacent loops, as in springs 15. The spring structure is covered by a suitable padding and upholstering 42.

Figure 4:
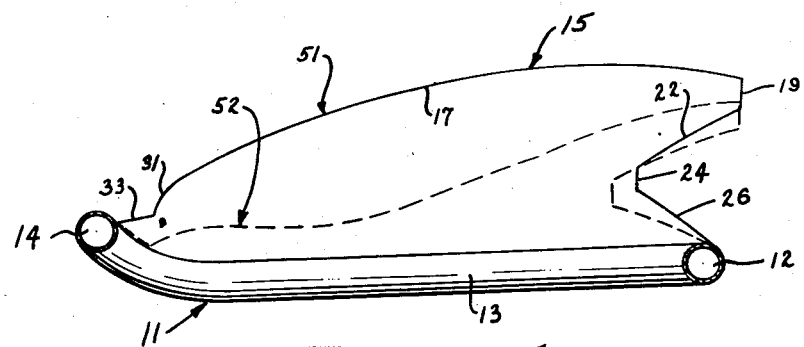
Figure 4 is a side elevation of the seat construction showing diagrammatically the configuration of the seat in its unloaded and loaded positions.

Reference is now made to Figure 4, which diagrammatically shows various positions of the seat under different load conditions. The full line 51 indicates the outline of a spring 15 when the latter is not under load. When loaded, the spring is deformed and assumes a position corresponding generally to that indicated in dotted lines by the reference character 52. The load has resulted in slightly flattening the crowned seating portion 17 of the spring, resulting in a slight elongation thereof. The greater portion of the normal seating load is taken by the rearward part of the seating portion 17 of the spring. The downward load at this point is transmitted through the downwardly curved portion 31 of the spring to the lever arm 33. The arrangement is such that the lower loop 32, which forms a vertex between the downwardly curved portion 31 and the lever arm 33, is placed under torsion, although a portion of the load is distributed to the adjacent loops in the lever arm 33. The degree of resiliency and flexibility obtained in the rearward portion of the seat can be varied by changing the curvature of the portion 31 and also by varying the length of the lever arm 33. The general construction is such that greater movement and seating comfort are achieved at the rearward portion of the seat than in conventional constructions. It will also be seen that the motion is in a generally vertical direction, rather than being transformed partially into a longitudinal movement.

At the forward part of the seating portion 17 of the seat, the latter is partially collapsed by the load, and the included angles between the seating portion 17 and the lever arm 22, and between the lever arm 22 and the attaching portion 26, are decreased. This results in placing in torsion the adjacent loops 18 and 21 at opposite ends of the connecting portion 19, as well as the adjacent loops 23 and 25 at opposite ends of the connecting portion 24. It will be apparent that at each of these junctures, the load is distributed between a pair of adjacent loops of the corrugated spring, instead of being taken entirely by a single loop. As a result, the maximum torsional stress carried by any single loop of the spring is considerably smaller, and the likelihood of failure correspondingly reduced. This advantageous result is accomplished without impairing the riding comfort of the forward portion of the seat, since the flexibility and resiliency of the latter are retained.

The illustrated embodiment of the invention shows a generally horizontally cushioned seat, but it will be apparent that the features of the present invention can be embodied in vertical back seat cushions as well as in other types of cushioned structures.

It will be understood that the invention is not to be limited to the exact construction shown and described, but that various changes and modifications may be made without departing from the spirit and scope of the invention, as defined in the appended claims.

What is claimed is:

1. A cushioned seat for a supporting frame having front and rear rails, comprising a wire spring unit bent into sinuous shape substantially in the supporting plane of the spring extending crosswise of said frame between the front and rear rails thereof, said spring unit including a horizontally corrugated seating portion, and an integral substantially V-shaped corrugated portion connecting the front end of said seating portion to the front rail of said frame, the vertex of said V-shaped portion having a double angular bend in a plane normal to the supporting plane of the sinuous spring, said double angular bend including adjacent loops of said sinuous wire spring.

2. A cushioned seat for a supporting frame having front and rear rails, comprising a continuously corrugated wire spring bent into sinuous shape substantially in the supporting plane of the spring and extending crosswise of said frame between the front and rear rails thereof, said spring being formed into a generally horizontal seating portion with a double angular bend at the forward end thereof, a rearwardly and downwardly inclined lever arm extending from said double angular bend and terminating in a second double angular bend, and a forwardly and downwardly inclined attaching portion extending from said last mentioned double bend and connected to the front rail of said frame, said double angular bends being formed in a plane normal to the supporting plane of the sinuous spring.

3. A seat spring formed of wire corrugated generally in the supporting plane of the spring, comprising a horizontally extending seating portion, a rearwardly and downwardly extending yielding lever arm adjacent the forward end of said seating portion and extending at an acute angle to said seating portion, a forwardly and downwardly extending yielding lever arm adjacent the rearward end of said first-mentioned lever arm and extending at an acute angle to said first-mentioned lever arm, and integral downwardly extending short connecting portions generally normal to said seating portion and integrally interconnecting said seating portion and said first and second-mentioned lever arms.

EDWIN D. SCOTT.
ELMER A. HERIDER.

REFERENCES CITED

The following references are of record in the file of this patent:

UNITED STATES PATENTS

| Number | Name | Date |
| --- | --- | --- |
| 2,133,611 | Freund | Oct. 18, 1938 |
| 2,177,175 | Freund | Oct. 24, 1939 |
| 2,235,554 | Hopkes et al. | Mar. 18, 1941 |
| 2,235,878 | Haberstump | Mar. 25, 1941 |
| 2,253,914 | Probst | Aug. 26, 1941 |
| 2,280,840 | Neely | Apr. 28, 1942 |
| 2,308,201 | Neely | Jan. 12, 1943 |
| 2,341,015 | Blumenstaadt et al. | Feb. 8, 1944 |
| 2,341,419 | Bank | Feb. 8, 1944 |
| 2,384,191 | Neely | Sept. 5, 1945 |
| 2,393,349 | Weingarten | Jan. 22, 1946 |
| 2,407,933 | Neely | Sept. 17, 1946 |

FOREIGN PATENTS

| Number | Country | Date |
| --- | --- | --- |
| 16,814 | Great Britain | of 1909 |